W. H. WOOD.
HANDSAW SET.
APPLICATION FILED JAN. 18, 1916.
1,190,972. Patented July 11, 1916.
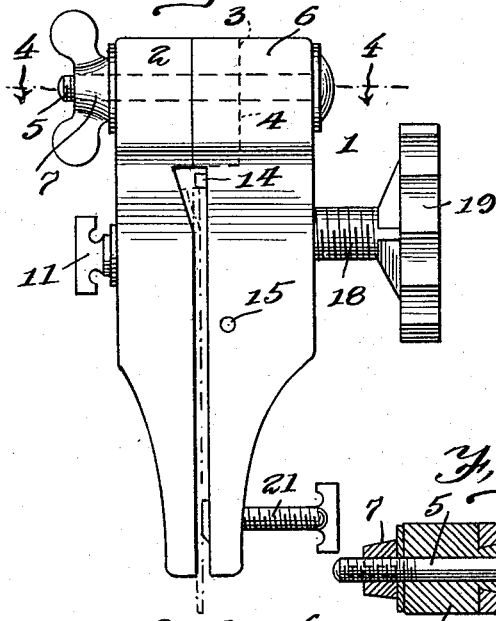
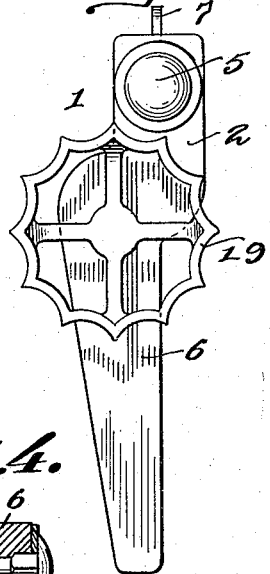
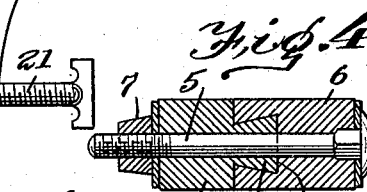
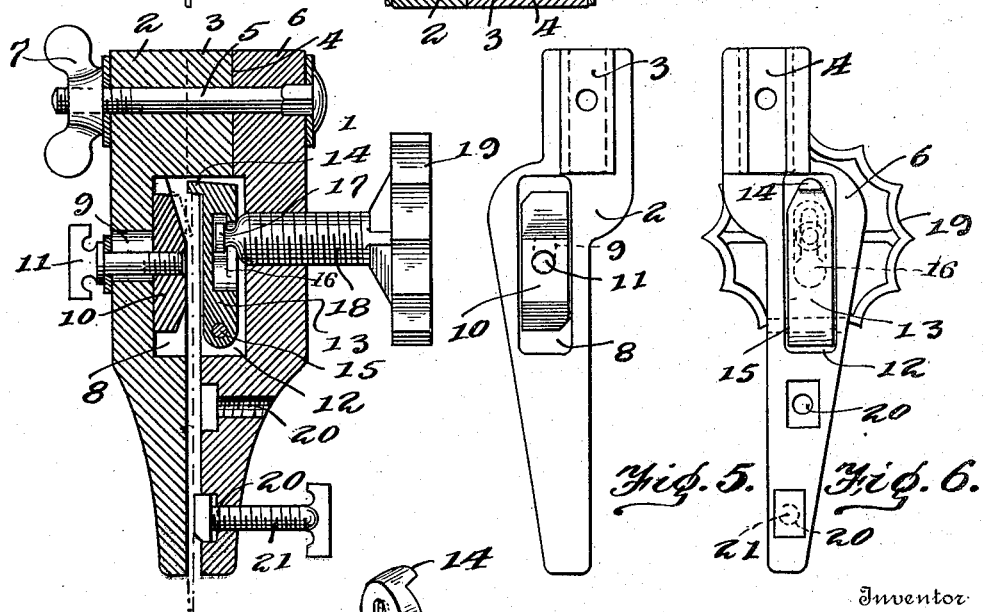
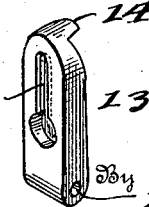
Inventor
Walter H. Wood
By Victor J. Evans
Attorney
Witnesses

UNITED STATES PATENT OFFICE.

WALTER H. WOOD, OF FOREST, IDAHO, ASSIGNOR OF ONE-HALF TO JOSEPH D. PARIS, OF FOREST, IDAHO.

HANDSAW-SET.

1,190,972.  Specification of Letters Patent.  Patented July 11, 1916.

Application filed January 18, 1916. Serial No. 72,802.

*To all whom it may concern:*

Be it known that I, WALTER H. WOOD, a citizen of the United States, residing at Forest, in the county of Lewis and State of Idaho, have invented new and useful Improvements in Handsaw-Sets, of which the following is a specification.

This present invention relates to improvements in saw setting apparatus.

In carrying out my invention it is my purpose to construct a saw set which shall be of a simple, cheap and efficient nature and wherein all of the teeth of the saw will be set at the same angle.

I also propose to produce a saw set of a light but strong construction so that the same may be conveniently carried in either the tool box or the pocket of the operator and which shall include two members or jaws that are effectively connected but which are properly spaced to receive the saw blade, means being provided upon one of the jaws for holding the blade firmly against the other jaw, and one of the jaws being provided with a reversible anvil member disposed opposite the teeth of the saw, the other jaw being provided with a pivoted hammer arranged opposite the anvil while a hand screw is provided for contacting with the pivoted hammer to swing the toothed end thereof against a tooth of the saw to bend the said tooth over the anvil.

A further object of the invention is to provide a saw set comprising a member having a guide slot to receive the saw and means for forcing the blade of the saw against one of the walls of the slot, to provide the said member with a reversible and removable anvil and to arrange a pivoted member, in the nature of a hammer, provided with a toothed end opposite the anvil, to provide a longitudinally movable actuating element for the hammer to force the said hammer in the direction of the anvil, and to provide means for sustaining the anvil in an adjusted position with relation to the hammer.

With the above and other objects in view, the improvement resides in the construction, combination and arrangement of parts set forth in the following specification and falling within the scope of the appended claims.

In the drawings: Figure 1 is a side elevation of a saw set constructed in accordance with the present invention, Fig. 2 is an end view of the same, Fig. 3 is a longitudinal sectional view approximately on the line 3—3 of Fig. 1, Fig. 4 is a sectional view approximately on the line 4—4 of Fig. 1, Fig. 5 is an inner face view of one of the members comprising the set, Fig. 6 is a similar view of the other member of the set, and Fig. 7 is a perspective view of the hammer member.

In the accompanying drawings the numeral 1 designates my improved saw set in its entirety. The set is constructed of two substantially similar members, each comprising a substantially rectangular element having one of its ends offset, and for the sake of convenience the rectangular portion of each of the elements will hereinafter be referred to as the jaw, and the offset portion thereof as the head. The head of one of the members has its inner flat face extended a slight but suitable distance over the inner flat face of its jaw, so that when the heads of the two members are brought into contact a space will be provided between the jaws, the said space being sufficient to receive the blade of the saw to be operated upon. One of the members, indicated for distinction by the numeral 2, has its head centrally formed with a longitudinally extending dove-tailed tongue 3, the head of the other member having a dove-tailed slot 4 to receive the tongue 3, a securing element, in the nature of a bolt 5, passing transversely and centrally through the heads of both of the members for locking the tongue 3 of the member 2 in the slot 4 of the member 6, a nut 7 being screwed upon the bolt. By arranging the heads of the members offset with relation to their jaw portions the bolt 5 may be readily withdrawn, without interfering with elements carried by either of the members, and hereinafter to be referred to, to permit of the separation of the members for a reason which will hereinafter be apparent.

The jaw of the member 2, upon its inner face, and at its juncture with its head, is formed with a substantially rectangular pocket 8, a substantially rectangular opening 9 entering from the outer face of the jaw into the said pocket. Adapted to be received in the pocket 8 is a substantially rectangular anvil member 10. This anvil member has its opposite corners beveled at different angles to accommodate the teeth of saws which are to be pitched or set at different angles, it being understood that the anvil is removable and reversible so that the same may accommodate the saws to be used on different classes of work. In order that the teeth of the saw may be set at a comparatively long or at a comparatively short length, I provide a thumb screw 11 which has its shank passing through the opening 9 and is received in a threaded orifice in the anvil, and by adjusting this thumb screw the anvil can be moved therewith longitudinally of the pocket and held in such adjusted position by the tightening of the thumb screw.

The jaw of the member 6 is provided upon its inner face with a longitudinally arranged pocket 12, disposed opposite the pocket 8, and within this pocket 12 is arranged the set member proper, which I shall refer to as the hammer, and which is designated by the numeral 13. The hammer has its end nearest the head of the member 6 provided with a tooth 14 and is pivoted in the pocket adjacent its opposite end, as indicated by the numeral 15. The tooth 14 is, of course, arranged opposite one of the beveled corners of the anvil 10 and the hammer is of such a size as to permit of its tooth 14 being received in the pocket 12, so that no obstruction will be offered the saw blade when the same is inserted in the slot or opening between the jaws of the members 2 and 6. The rear face of the hammer 13 adjacent the end thereof provided with the tooth 14 is formed with a key-hole slot 16, and the opposite walls of this slot are beveled to receive the flanged end 17 provided at the reduced portion of the threaded stem 18 of a turning wheel 19. The threaded stem 18 passes through a threaded orifice in the jaw of the member 6, and by operating the wheel 19 the hammer 13 may be swung upon its pivot to force the tooth 13 thereof toward or away from the anvil 10.

The jaw of the member 6 is provided with a plurality of spaced transverse threaded orifices 20, and if desired a single binding screw 21 may be screwed in any of the said orifices to contact with the blade of the saw to force the same against the jaw of the member 2 to bring the teeth of the saw in proper register with the beveled edge of the anvil 10, or each of the said orifices may be provided with a binding screw. The idea of arranging the binding element at various parts of the device is to permit of saw blades of varying widths being held in the slot between the jaws of the device.

By arranging the heads of the jaw members out of a line with the said jaws it will be noted that the bolt 5 may be removed without danger of the same contacting with the turning wheel 19 and it is, of course, desirable to separate the members 2 and 6 in order to arrange the anvil in the pocket 8 so that any of its beveled corners may be contacted by the tooth when the hammer is operated by the turning wheel, and also that access might be obtained to the hammer should the tooth of the same become worn so that a new hammer may be supplied.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. A saw set including two companion members each comprising a longitudinal jaw having a head portion offset from the jaw and the head of one of the members projecting over the jaw thereof, one of said heads having a dove-tailed tongue to be received in a dove-tailed groove in the other head, removable means for connecting the heads, an anvil carried by one of the jaws, a hammer carried by the other jaw, and a longitudinally movable operating member for the hammer.

2. A saw set including two companion members each comprising a longitudinal jaw having one of its ends formed with a head, means for connecting the heads to retain the inner faces of the jaws spaced, said jaws having their opposing faces each provided with a substantially rectangular pocket, a reversible and longitudinally adjustable anvil member disposed in one of the pockets, a pivoted hammer in the other pocket, and a longitudinally movable operating member for the handle.

3. A saw set including two companion members each comprising a longitudinal jaw having a head portion offset from the jaw, means for removably connecting the head portions and for sustaining the opposing faces of the jaws spaced, said opposing faces of the jaws having oppositely disposed substantially rectangular pockets, a reversible and longitudinally movable anvil in one of the pockets, a hammer member in the other pocket and having one of its ends pivotally secured therein, the outer face of the anvil having a keyhole slot, and a threaded operating member passing through the jaw carrying the hammer and having a reduced flange and which is adapted to be passed through the larger opening of the keyhole slot and to be received in the smaller opening thereof, as and for the purpose set forth.

In testimony whereof I affix my signature in presence of two witnesses.

WALTER H. WOOD.

Witnesses:
A. A. ROGERS,
ORLANDO NEWTON.